H. C. WELLS.
GRAIN HARVESTER.
APPLICATION FILED SEPT. 5, 1917.

1,295,651.

Patented Feb. 25, 1919.
2 SHEETS—SHEET 1.

WITNESSES
Gordon Ladshaw
Wm Zeaman

INVENTOR
Homer C. Wells.

Richard B. Owen.

ATTORNEY

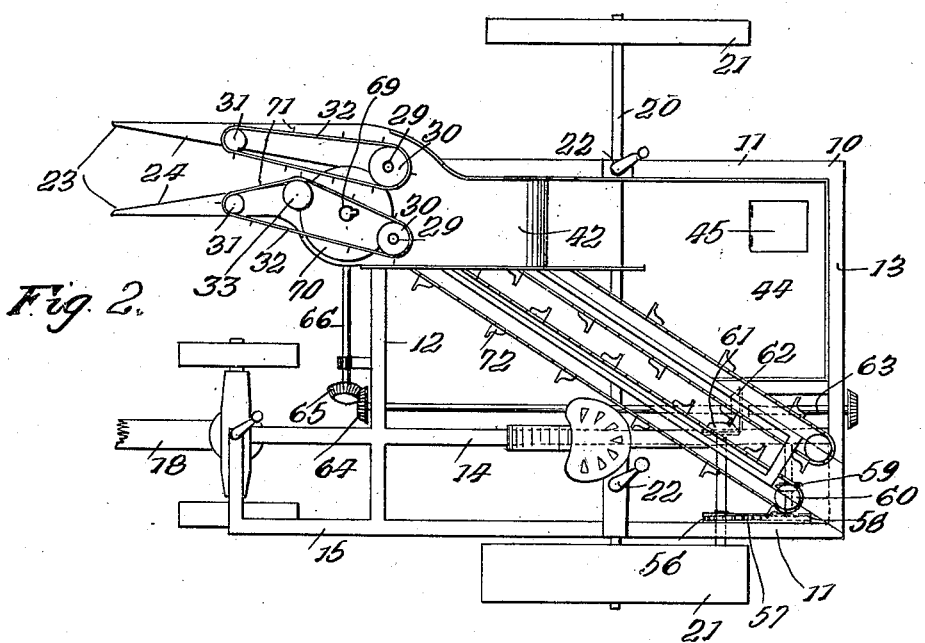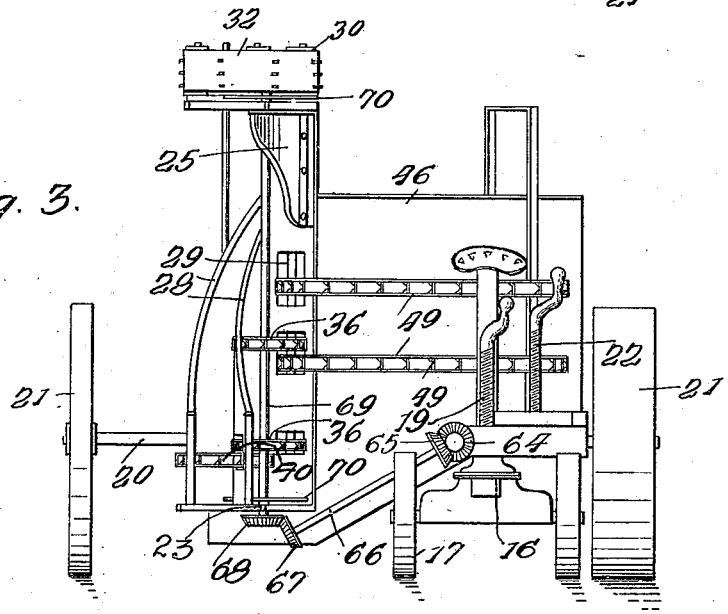

UNITED STATES PATENT OFFICE.

HOMER C. WELLS, OF MATHIS, TEXAS.

GRAIN-HARVESTER.

1,295,651. Specification of Letters Patent. Patented Feb. 25, 1919.

Application filed September 5, 1917. Serial No. 189,879.

*To all whom it may concern:*

Be it known that I, HOMER C. WELLS, a citizen of the United States, residing at Mathis, in the county of San Patricio and State of Texas, have invented certain new and useful Improvements in Grain-Harvesters, of which the following is a specification.

This invention has relation to grain harvesters, and has for an object to provide a machine embodying means for severing the stalks at a point slightly above the level of the ground, for severing the heads from the stalks, and for conveying the stalks in one direction to a binder and the heads in a suitable receptacle to receive the same.

Another object of the invention is to provide a machine having the above named characteristics and means for adjusting the several cutting devices so as to permit the stalks to be severed at a point above the level of the ground, and to permit the heads to be severed at any point along the stalk.

A still further object of the invention is to provide a grain harvester of the character above described embodying means for adjusting the device as a whole toward and away from the ground.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:

Fig. 2, is a view of the machine in plan, and

Fig. 3, is a view of the machine in front elevation.

Figure 1:
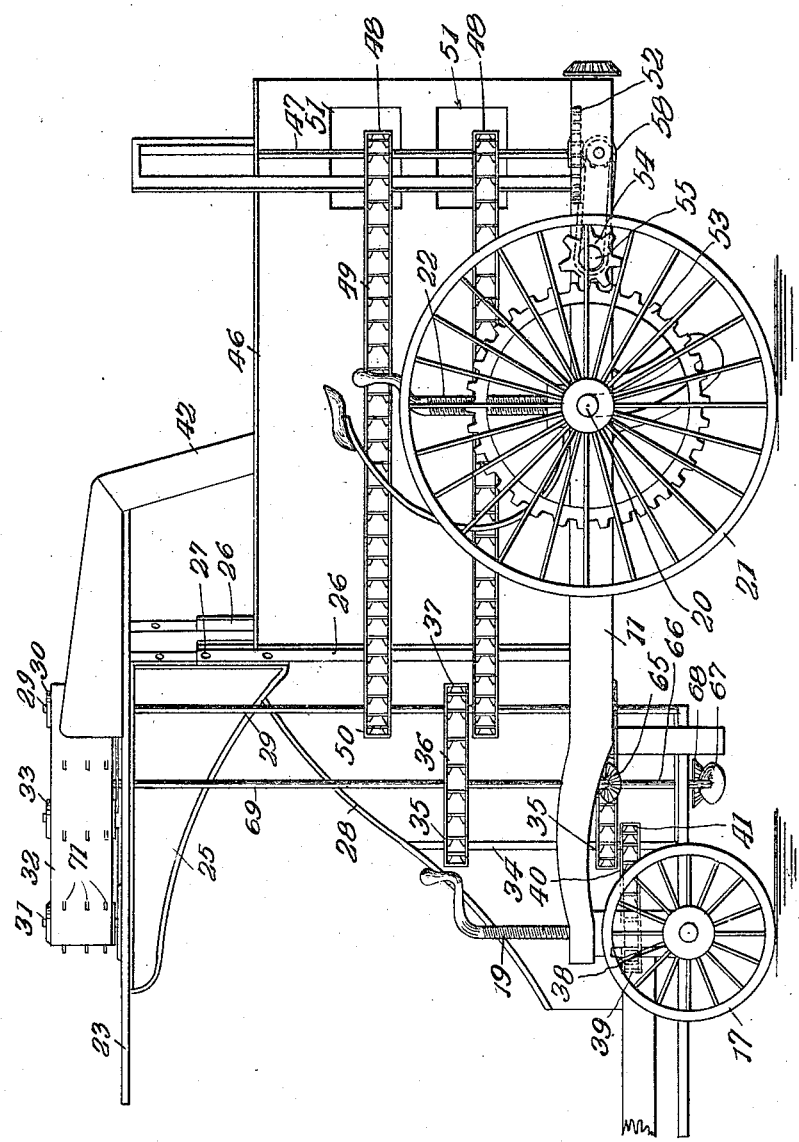
Figure 1, is a view in side elevation of a grain harvester constructed in accordance with my invention.

With reference to the drawings 10 indicates a frame comprising longitudinal frame bar 11, front and rear transverse bars 12 and 13 respectively and a longitudinally extending frame bar 14 parallel to and adjacent the left hand longitudinal frame member 11 in spaced relation thereto. An extension of the frame 15 is provided formed by extending the frame bars 14 and 11 adjacent thereto in a forward direction for connection to a fifth wheel indicated at 16. The fifth wheel structure supports a pair of supporting and steering wheels 17 to which a tongue 18 is connected. An adjusting screw 19 is disposed in a vertical position, threadedly engaged in the extension 15 of the frame and drilled or otherwise connected to the fifth wheel structure, whereby by rotating the adjusting screw the front end of the frame may be elevated or depressed away from or toward the ground. An axle 20 is extended transversely of the frame at a point substantially midway the ends thereof to support wheels 21 at each end. Vertical, adjusting screws 22 are threadedly engaged in the frame bars of the machine and swiveled to the axle whereby by rotating the screws the rear end of the frame may be adjusted toward or away from the ground, thereby permitting the adjustment of the frame as an entirety.

Located at the front end of the machine and adjacent the right hand end thereof are pairs of opposed guides 23, the adjacent edges 24 thereof being disposed in rearwardly converging relation as clearly shown in Fig. 2. The lower guide members 23 are rigidly connected to the frame, while the upper guide members are supported upon guide flanges 25 curved longitudinally and which in turn are supported upon a pair of uprights 26 mounted on the main frame. The vertical edges of the guide flanges are connected to the uprights by means of bolts 27 which extend through any one of the series of openings formed in the uprights whereby the flanges and consequently the upper guides may be adjusted vertically relative to the frame. Guide flanges 28 are also provided for the lower guides 23, the same converging rearwardly and secured rigidly to the frame. The upper and lower guides 23, as well as the guide flanges 25 and 28 are all disposed in rearwardly converging relation, the object thereof being to receive the grain during the forward travel of the machine and to gradually crowd the same toward the throat of the guides to be acted upon by various elements now to be described.

A pair of vertical, transversely spaced shafts 29 are mounted in the frame, with their ends journaled in the guides 23 adjacent the rear end thereof. A roller 30 is mounted on the upper end of each shaft 29 and a pair of rollers 31 are provided, one upon each member of the upper guide 23 adjacent the forward end thereof. A pair of belts 32 are provided, the same being stretched between the rollers 30 and 31 to dispose adjacent stretches in proximity and in contiguous relation to the adjacent edges 24 of said guide members. For this purpose an idler roller 33 may be provided upon the guide member to engage the inner stretch of the left hand belt 32 to bring a portion of the belt in contiguous relation to the left hand guide member as shown in Fig. 2. A pair of short vertical transversely spaced shafts 34 are mounted in the lower guide member 23 in advance of the shafts 69, said shafts 34 supporting each a pair of vertically spaced sprockets 35 which are connected by means of chains 36 to sprockets 37 on the shafts 29. A pair of stub shafts 38 are provided upon the lower guide member 23 in advance of the shaft 35 and a sprocket wheel 39 is mounted on each of said shafts 38 in advance of the shafts 35 and a sprocket wheel 39 is mounted on each of the shafts 38 in advance of the shafts 34, said sprockets being connected by means of chains 40 to sprockets 41 mounted on the shafts 34. The chains 36 and 40 are thus arranged to lie in contiguous relation to the guides 23 and their flanges 25 and 28 so as to engage the stalks of the grain between adjacent chains and to guide them during forward movement of the vehicle toward the throat of the guide members.

The upper guide members 23 adjacent the rear ends thereof is provided with a spout 42 which extends rearwardly and downwardly and is designed to empty into a receptacle 44 carried by the main frame, the floor of the receptacle being provided with a trap door 45 through which the grain may be delivered as the occasion requires.

Extending diagonally across the main frame from forward to rearward, and from right to left are a pair of guide walls 46 in spaced relation. Adjacent the rear ends of the guide walls are a pair of vertical, transversely spaced shafts 47. A pair of sprockets 48 are mounted upon each shaft 47, said sprockets being connected by means of chains 49 to sprockets 50 mounted on the shaft 29. The chains 49 are thus disposed to lie in contiguous relation to the guide walls 46, one stretch of one chain passing along the outside of the wall, and then through openings 51 in the walls to permit the other stretch of chain to travel on the inner side of the walls. The lower end of each shaft 47 is provided with a spur gear 52 which are in mutual meshing engagement to insure rotation of the shafts 47 in opposite directions. A relatively large spur gear 53 is mounted on the left hand supporting wheel 21 of the main axle for meshing engagement with a relatively small spur gear 54 mounted upon a transversely extending shaft 55 which is journaled in the main frame. Said shaft 55 carries a sprocket wheel 56 which is connected by means of a chain 57 to a sprocket wheel 58 mounted upon a shaft 59 which is disposed parallel to the shaft 55 and rearwardly thereof. Said shaft 58 carries a bevel gear 59 which meshes with the bevel gear 60 mounted upon the lower end of one of the shafts 47 as shown in Figs. 1 and 2.

The inner end of the shaft 55 carries a bevel gear 61 which is in meshing engagement with the bevel gear 62 mounted upon the intermediate portion of the longitudinally extending shaft 63 journaled in the front and rear transverse members of the main frame. The forward end of the shaft 63 is provided with a bevel gear 64 which meshes with the bevel gear 65 mounted upon the upper end of an inclined shaft 66 journaled on the front end of the main frame. The lower end of the inclined shaft 66 is provided with a bevel gear 67 which meshes with the bevel gear 68 mounted upon the lower end of the vertical shaft 69 at the forward end of the frame.

In operation, the vehicle is propelled or drawn by any suitable power, and rotation of the supporting wheels 21 is transmitted by means of the relatively large gear 53 to the shaft 55 through the medium of the relatively small gear 54. Rotation of the shaft 55 is transmitted through the chain 57 to one of the vertical shafts 47, the rotation thereof being transmitted by means of the bevel gear 52 to the other shaft. The chains 49 are thus actuated so that their inner or adjacent stretches travel in a rearward direction. Moreover, the rotation of the shaft 47 is transmitted by means of said chains 49 to the shaft 29 at the front end of the frame. Rotation of said shaft 29 is imparted to the belt 32 provided upon the upper side of the upper guide 23, as well as to the chains 36 and 40 which operate in conjunction with said guide. The upper and lower ends of the shaft 69 is provided with a circular disk 70 having a peripheral cutting edge, the upper disk 70 having its edge located exactly at the throat of the guide member 23 or at the point where the inner stretches of the belts 32 approach each other as clearly shown in Fig. 2.

Rotation of the main drive shaft 55 is also transmitted to the longitudinally extending shaft 63 and thence to the inclined shaft 66 which in turn furnishes power to drive the shaft 69. The cutting disks 70 are thus rotated at a high rate of speed owing to the ratio of the gears 53 and 54. During forward travel of the machine the grain is fed and crowded into the space between the guides 23, the lower ends of the stalks being severed by means of the lower disk 70 at a point slightly above the ground level, and the heads of the stalks being severed by means of the upper cutting disks 70. The heads of the stalks after being severed are engaged between the adjacent stretches of the belts 32 and carried rearwardly into the spout 42. It will be noted that the belts 32 are provided with suitable spurs 71 to facilitate the action of the belts. The stalks are then carried by means of the chains 36 and 40 into a position to be engaged between adjacent stretches of opposed chains 49 which extend diagonally across the machine, the stalks being carried by said chains rearwardly. At the rear end of the chains or the guide walls 46, a suitable binding mechanism such as is provided upon any grain binder may be provided to gather the stalks and tie them into bundles. To facilitate the gripping action of the chains 46 suitable blocks 72 may be provided.

Thus it will be seen that I have provided a machine embodying many novel features of construction, the essential object however being to sever the heads cleanly from the stalks of the grain, to carry the heads of the grain in one direction and the stalks in another. It will be further apparent that by adjusting the machine as an entirety toward or away from the ground, the stalks may be severed at their lower ends at any desired elevation, and by adjusting the flanges 25 upon the uprights 26 the heads of the grain may be severed at any desired point along the stalk.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. In a grain harvester, a frame, a pair of guide flanges stationarily mounted thereon, vertical guide ways at the rear of said flanges, a second set of guide flanges mounted for vertical movement in the guide ways, toward and away from the stationary guide flanges, and outwardly diverging guide members mounted on said movable guide flanges.

2. In a grain harvester, a frame, a pair of substantially triangular guide flanges stationarily mounted thereon, in spaced relation, vertical guide ways at the rear of said guide flanges, vertically movable guide flanges mounted in said guide ways for movement toward and away from the stationary flanges; outwardly diverging guide members mounted on said movable flanges, vertical shafts mounted on the frame and extending through the guide members, and conveyer and cutting mechanism mounted on said guide members operably connected to the shafts for vertical adjustment and for operation by rotation of said shafts.

3. In a grain harvester, a frame, substantially triangular guide flanges mounted on the frame in spaced relation having their lower edges horizontal and their rear edges vertical, a guide-way formed at the rear edge of each of said flanges, rearwardly extending walls mounted on the frame in spaced relation having their forward edges secured to the guide-ways, vertically movable substantially triangular guide flanges mounted in said guide-ways for movement toward and away from the stationary guide-flanges, vertical shafts mounted in the frame, outwardly diverging guide members mounted on the movable guide flanges through which the shafts project, endless elements mounted on the guide members, having connection with the shafts, cutters between the endless elements also having connection to the shafts, means for rotating the shafts, and endless elements movable in contiguous relation to the rearwardly extending walls operably connected to the shafts for operation thereby.

In testimony whereof I affix my signature in presence of two witnesses.

HOMER C. WELLS.

Witnesses:
R. GILLETT,
R. A. CAIN.

Copies of this patent may be obtained for five cents each, by addressing the "Commissioner of Patents, Washington, D. C."